(12) United States Patent
Lindner et al.

(10) Patent No.: US 6,367,288 B1
(45) Date of Patent: Apr. 9, 2002

(54) METHOD AND APPARATUS FOR PREVENTING BURNER-HOLE BUILD-UP IN FUSED SILICA PROCESSES

(75) Inventors: Raymond E. Lindner, Corning; Robert E. McLay, North Syracuse; Mahendra K. Misra, Horseheads; Michael H. Wasilewski, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/473,664

(22) Filed: Dec. 29, 1999

(51) Int. Cl.[7] ............................................. C03B 37/018
(52) U.S. Cl. ..................... 65/531; 65/524; 65/525; 65/526; 65/528; 65/532; 65/413; 65/464; 65/356; 431/2; 431/3; 431/8; 431/9; 431/177; 431/181; 431/187; 431/190; 431/284; 431/159; 431/353; 432/2; 432/4; 432/22; 432/26; 432/233
(58) Field of Search ................... 65/524, 525, 526, 65/528, 532, 531, 464, 356, 413; 431/2, 3, 8, 9, 177, 181, 187, 190, 284, 159, 353; 110/343; 432/2, 4, 22, 26, 233

(56) References Cited

U.S. PATENT DOCUMENTS

| | | | |
|---|---|---|---|
| 4,303,386 A | 12/1981 | Voorheis et al. | 431/177 |
| 4,775,314 A * | 10/1988 | Sternling | 431/4 |
| 4,803,948 A | 2/1989 | Nakagawa et al. | 118/725 |
| 4,950,156 A | 8/1990 | Philipossian | 432/253 |
| 5,291,841 A * | 3/1994 | Dykema | 110/347 |
| 5,567,141 A | 10/1996 | Joshi et al. | 431/8 |
| 5,698,484 A * | 12/1997 | Maxon | 65/413 |
| 6,112,676 A * | 9/2000 | Okazaki et al. | 110/261 |
| 6,164,956 A * | 12/2000 | Payne et al. | 431/3 |
| 6,176,894 B1 * | 1/2001 | Anderson et al. | 75/414 |

FOREIGN PATENT DOCUMENTS

EP 0 529 667 A2 8/1992 ............. F23C/9/00

OTHER PUBLICATIONS

The American Heritage Dictionary, Second College Edition, pp. 661–662, copyright 1982.*

* cited by examiner

*Primary Examiner*—Michael Colaianni
(74) *Attorney, Agent, or Firm*—Burton Turner; Timothy M. Schaeberle

(57) ABSTRACT

In furnaces for producing high purity fused silica glass boules, glass particles have a tendency to build-up adjacent the burner hole rim. It was discovered that unburned furnace gases containing silica particles where re-circulated in the furnace close to the burner hole rim and reacted with the oxygen of infiltrated air adjacent the burner hole, and thus deposited such particles in the form of a glassy build-up about the rim of the burner hole. In order to eliminate the source of oxygen adjacent the burner hole rim, a curtain of an inert gas is caused to flow through the burner hole between the sidewalls of the burner hole and the flame of the burner. Accordingly, the curtain of inert gas inhibits the combustion of the unburned hydrogen and carbon monoxide furnace gases adjacent the exit rim of the burner hole and thereby minimizes glass build-up about the burner hole rim.

18 Claims, 3 Drawing Sheets

METHOD AND APPARATUS FOR PREVENTING BURNER-HOLE BUILD-UP IN FUSED SILICA PROCESSES

FIELD OF THE INVENTION

This invention relates to the production of high purity fused silica glass, and in particular, to methods and apparatus for minimizing the build-up of glass deposits around the burner hole in a high purity fused silica refractory furnace.

BACKGROUND OF THE INVENTION

In overview, high purity fused silica glass is made by depositing fine particles of silica on a sand bait in a refractory furnace at temperatures exceeding 1650° C. The silica particles are generated in a flame when a silicon containing raw material along with natural gas is passed through a burner into the furnace chamber. These particles are deposited on the hot surface of a rotating body containing a sand bait, where they consolidate into a very viscous fluid which is later cooled to the glassy (solid) state. The rotating body is in the form of a refractory cup or containment vessel which is used to provide insulation to the glass as it builds up, and the furnace cavity formed by the cup interior and the crown of the furnace is kept at high temperatures. In the art, glass making procedures of this type are known as vapor phase hydrolysis-oxidation processes, or simply as flame hydrolysis processes. The body formed by the deposited particles is often referred to as a "boule" and it is understood that this terminology includes any silica-containing body formed by a flame hydrolysis process.

FIG. 1 shows a prior art furnace 10 for producing fused silica glass. The furnace 10 includes an outer ring wall 12 which supports a crown 14. The crown 14 is provided with a plurality of burner holes 16, of which one is shown in the drawing. Each burner hole 16 has a burner 18 positioned thereabove at an inlet end for directing a flame through the burner hole 16 and into the cavity 20 of the furnace 10. The furnace 10 is provided with a rotatable base 22, which with containment wall 24 forms a cup or containment vessel 26. The rotatable base 22, forming the bottom of the cup-like containment vessel 26, is covered with high purity bait sand 28 which collects the initial silica particles forming the boule 30. A shadow wall 32 is provided between the containment wall 24 and the outer ring wall 12, and a suitable seal 34 is formed between the shadow wall 32 and the outer ring wall 12 to prevent the infiltration of air between such wall portions into the furnace cavity 20.

However, as indicated in FIG. 1, the design of the furnace is such that room air may be easily infiltrated into the furnace through the burner holes 16 in the crown 14 of the furnace and through the gap 36 formed between containment wall 24 and shadow wall 32, as shown by arrows a and b, respectively. The infiltrated air reduces the concentration of hydrogen in the furnace atmosphere in two ways. Firstly, it physically dilutes the combustion gases and secondly, it brings in additional oxygen that reacts with the hydrogen to form water vapor. The overall result of the air entrained is a reduction in dissolved hydrogen in the glass. At the same time, the air infiltrated through the burner hole provides the oxygen necessary to react with unburned hydrogen and CO furnace gases within the furnace cavity that are re-circulated close to the burner hole.

The quality of the high purity fused silica boule can be improved by increasing the amount of hydrogen dissolved in the boule. One method of increasing hydrogen in the glass can be accomplished by increasing the hydrogen in the furnace atmosphere. Hydrogen is produced as an intermediate species during the combustion of the organic raw material of silica and the methane gas. It is known from flame chemistry calculations that burning a fuel-rich mixture of fuel and oxygen can increase hydrogen in the furnace atmosphere. However, on burning such a fuel-rich mixture, it was found that the overall run time of the furnace is significantly decreased because of a build-up of glass around the burner hole. The shorter run times of the furnace due to the glass build-up has created problems which adversely affect the glass properties, such as transmission.

FIG. 2 illustrates the problem which we have identified that causes undesirable build-up of silica particles around the burner hole. The flow fields of the various gases are shown by arrows a, c, and d in FIG. 2. A back-flow of furnace gases, such as unburned CO and $H_2$, into the burner hole 16, and about the outer periphery of the flame F is shown by arrows c. The back-flow shown by arrows c passes close to a hot bottom edge or exit end 15 of the burner hole 16. When the fuel/oxygen mixture is fuel-rich, such conditions result in partial combustion of the fuel and leaves substantial amounts of unburned CO and $H_2$ in the furnace atmosphere that are circulated such as shown by arrows d within the burner hole 16.

Therefore, when the unburned CO and $H_2$ are pulled into the burner hole, such gases encounter oxygen from the crown flow shown by arrows a and thus such gases burn very close to the burner hole exit end or rim 15. Since the back-flow stream c already contains silica particles, a locally high temperature region around the burner hole exit end causes silica particles to deposit and form a glassy build-up 38 at an exit end 15 of the burner hole 16 at a junction with a bottom edge of the crown 14 within the cavity 20 of the furnace 10. It thus became an object of the invention to minimize the combustion of re-circulated hydrogen and carbon monoxide furnace gases close to the burner hole exit end, and several approaches were entertained including the use of a gaseous curtain to minimize oxygen concentrations next to the burner hole sidewalls. The use of gaseous curtains are known for unrelated purposes, such as for preventing the contamination of wafers in semiconductor manufacturing as shown in U.S. Pat. Nos. 4,803,948 and 4,950,156; and for cooling burner nozzles with oxygen as shown in U.S. Pat. Nos. 4,303,386 and 5,567,141.

It is apparent that there is a need for not only recognizing a problem of glass build-up about the burner hole in high purity fused silica processes, but also for a solution to such problem while maintaining high quality fused silica glass boules.

SUMMARY OF THE INVENTION

In view of the foregoing, it is an object of this invention to provide improved method and apparatus for producing silica-containing boules by flame hydrolysis. In particular, it is an object of the invention to inhibit or minimize glass build-up around the burner hole in high purity fused silica processes. It is a further object of the invention to minimize the combustion of recirculated furnace gases including hydrogen and carbon monoxide, close to the burner hole exit rim in a furnace for producing high purity fused silica, by reducing the concentration of oxygen in the vicinity of the burner hole rim through the use of an inert gas curtain between the burner flame and the sidewalls of the burner hole.

BRIEF DESCRIPTION OF THE DRAWINGS

The drawings are not intended to indicate scale or relative proportions of the elements shown therein. Like reference characters designate like or corresponding parts in the various figures.

DESCRIPTION OF THE PREFERRED EMBODIMENTS

Having identified the problem of glass build-up adjacent to the exit end or rim of the burner hole as being caused by the combustion of re-circulated furnace gases including hydrogen and carbon monoxide close to the burner hole rim, it became apparent that the solution to the problem involved reducing the concentration of oxygen in the vicinity of the burner hole rim. One possibility of accomplishing this end would be to change the outermost ring of gas stream in the burner from oxygen to an inert gas, such as argon or nitrogen. Another method would be to flood the region around the burner on the top surface of the crown with an inert gas in order to provide a curtain of inert gas between the burner hole walls and the flame front. One problem with providing the outermost ring of gas in the burner with an inert gas is that even though such method would reduce the concentration of oxygen in the vicinity of the burner hole rim, it also takes away the oxygen necessary to burn the natural gas and provide the heat necessary to maintain the furnace temperature. Accordingly, the option of utilizing an inert gas curtain not only retains the flexibility of adding more oxygen in the burner flow, but also reduces the oxygen concentrations right next to the burner hole sidewall 17. Although some build-up may still occur because of the localized heating close to the rim of the burner hole, the fact that oxygen concentrations are minimized next to the burner hole wall by the inert curtain, the amount of any build-up is substantially reduced.

Figure 1:
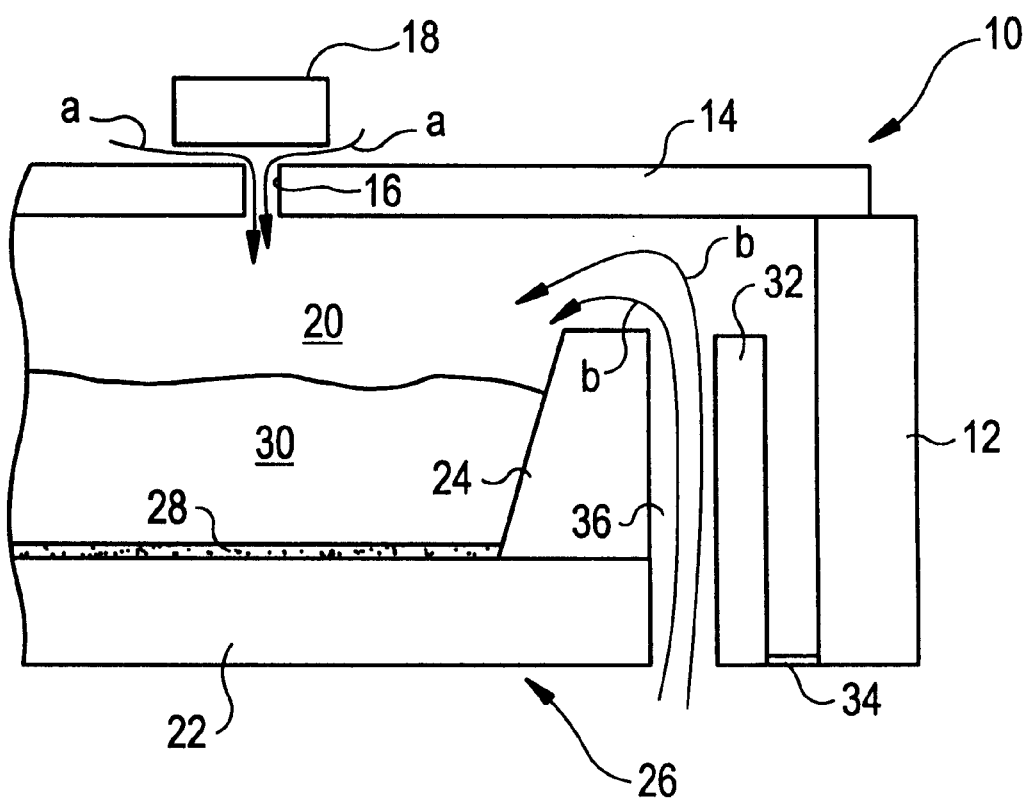
FIG. 1 is a fragmental schematic diagram in elevation of a prior art furnace used to produce fused silica boules using a flame hydrolysis process.
Figure 2:
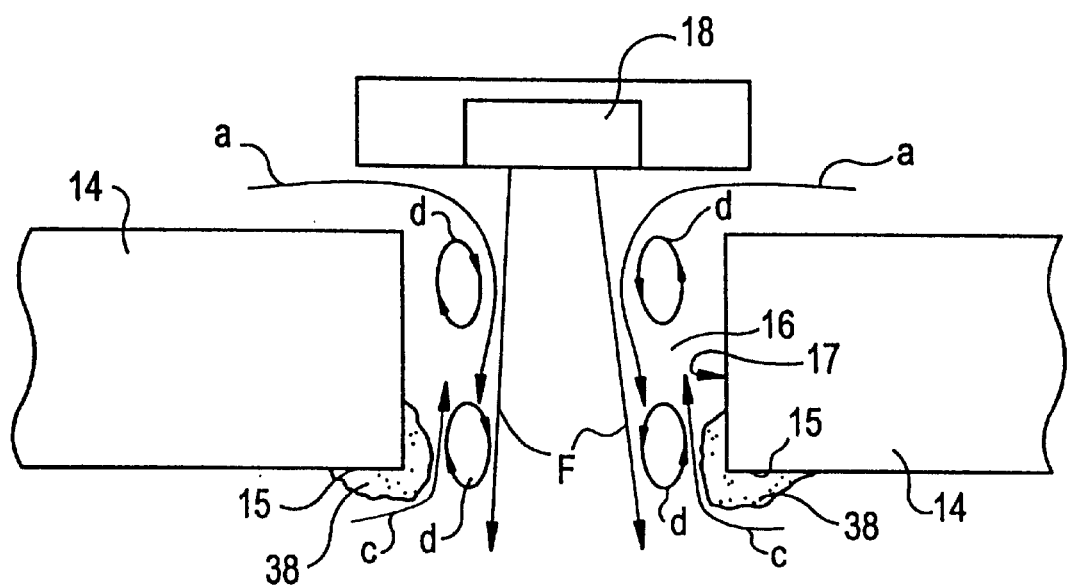
FIG. 2 is an enlarged fragmental view in elevation of a portion of the furnace shown in FIG. 1.
Figure 3:
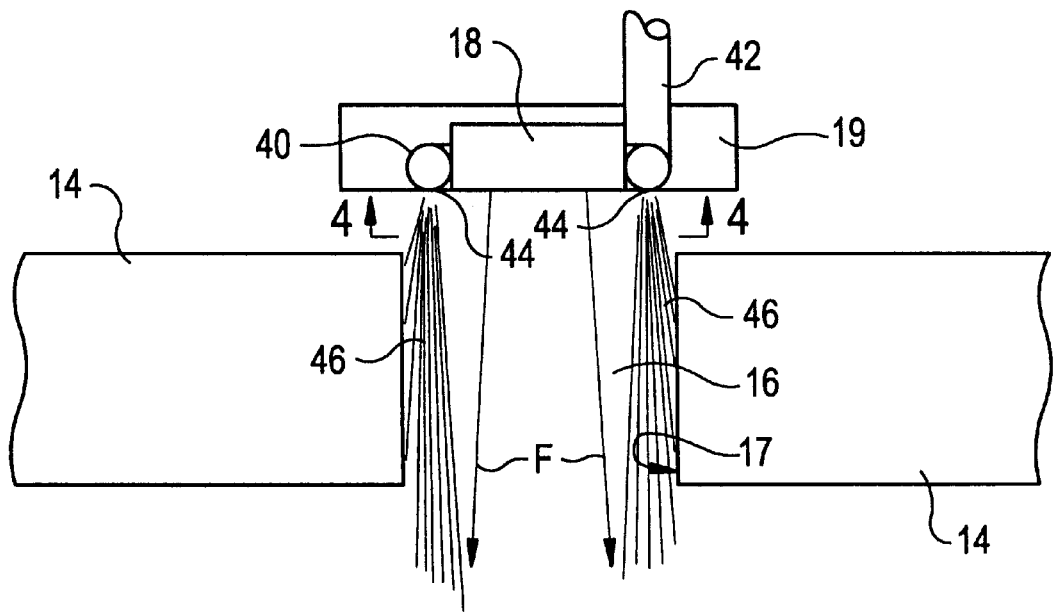
FIG. 3 is an enlarged fragmental view similar to FIG. 2, but showing the improvement of the present invention.
Figure 4:
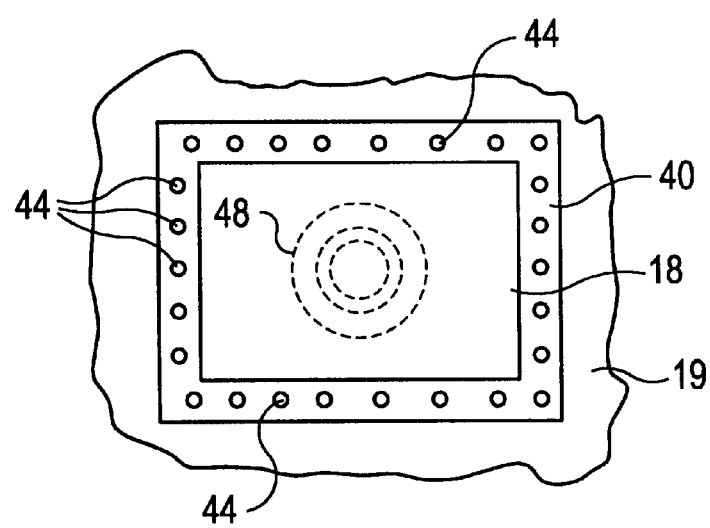
FIG. 4 is a slightly enlarged plan view of the burner and inert gas ring taken along line 4—4 of FIG. 3.

Referring now to FIGS. 3 and 4, burner block 18 is shown contained by a suitable support 19 and is surrounded by a tubular ring 40. A supply conduit 42 connects to the ring 40 for supplying an inert gas thereto. The ring 40 has a plurality of outlet holes 44 directed toward burner hole 16 for providing a curtain 46 of inert gas about the flame F within the burner hole 16. The burner face 48 is shown as concentric circles in FIG. 4.

As a specific embodiment and as schematically shown in FIG. 4, a tubular ring 40 is fabricated about a rectangular burner block 18. A plurality of outlet holes 44 having a diameter of about 0.040 inches and directed toward the burner hole 16, were drilled along the tube length. When nitrogen was supplied to the tube 40 by means of supply conduit 42, the nitrogen flowed through the tube and a steady curtain of nitrogen was created around the burner by means of the outlet holes 44. Due to the fact that a negative pressure is maintained inside the furnace cavity 20, the nitrogen released around the burner is inspirated through the burner hole 16 in a column-like flow along the sidewalls 17 thereof. The flow of nitrogen was set at 28 SLPM to create and maintain an inert gas curtain between the sidewalls 17 of the burner hole 16 and the flame F. The nitrogen curtain 46 helps to minimize the combustion of the unburned furnace gases which contain silica particles, and thereby minimizes the glass build-up close to the rim or exit end of the burner hole. Accordingly, with the present invention not only is it possible to minimize the burner hole build-up of glass, but also increase run times of the furnace and produce thicker boules with increased dissolved hydrogen.

Although the tubular ring 40 is shown in a rectangular configuration, it will be understood that the ring may be square, round, oval or any desired configuration that conforms to the burner block being utilized. Further, although we have disclosed the now preferred embodiments of our invention, additional embodiments may be perceived by those skilled in the art without departing from the spirit and scope of the invention as defined in the appended claims.

We claim:

1. In a furnace for producing silica glass,
    at least one burner hole formed in a crown of said furnace,
    a burner positioned for providing a flame within said burner hole, and
    means for inhibiting the build-up of glass about an exit end of said burner hole.

2. In a furnace for producing silica glass as defined in claim 1, wherein said means for inhibiting the build-up of glass includes means for providing a gaseous curtain within said burner hole flowing between and in contact with sidewalls of said burner hole and said flame.

3. In a furnace for producing silica glass as defined in claim 2, wherein said burner is positioned within a burner block, said means for providing a gaseous curtain includes a tubular ring surrounding said burner block, and said tubular ring is provided with inlet conduit means for receiving a supply of an inert gas and a plurality of outlet hole means directed toward said burner hole for providing a curtain of inert gas between said burner flame and the sidewalls of said burner hole.

4. In a furnace for producing silica glass as defined in claim 3, wherein said plurality of outlet hole means includes a plurality of outlet holes formed in said tubular ring which encircle said burner block to form a columnar curtain of gas about the burner flame.

5. In a furnace for producing silica glass as defined in claim 1, including means for infiltrating ambient air into the furnace, cavity means within the furnace for promoting re-circulation of unburned gases from said burner back into said burner hole, and said means for inhibiting the build-up of glass about the burner hole includes means for restraining the oxygen from the infiltrated air from reacting with the unburned gases adjacent the exit end of the burner hole and thereby inhibit glass build-up thereabout.

6. In a furnace for producing silica glass as defined in claim 5, wherein said means for restraining the oxygen from reacting with the unburned gases includes a curtain of inert gas flowing between and in contact with both wall portions of said burner hole and the flame within said burner hole.

7. In a furnace for producing silica glass as defined in claim 6, wherein said curtain of inert gas comprises a column-like flow of a gas selected from argon and nitrogen.

8. In a furnace for producing silica glass as defined in claim 5, wherein said means for inhibiting the build-up of glass includes a tubular ring surrounding said burner, said ring having a plurality of outlet holes surrounding said burner and being directed toward said burner hole, and inlet conduct means for supplying an inert gas to said tubular ring for discharge from said outlet holes in a columnar curtain of gas about said flame within said burner hole.

9. A method of inhibiting the build-up of glass about a burner hole in a high purity fused silica glass furnace wherein infiltrated air tends to react with re-circulated furnace gases resulting in the deposit of glass particles about an outlet end of the burner hole, which comprises, providing a curtain of inert gas between and in contact with wall portions of the burner hole and a flame generated therein by a burner positioned adjacent an inlet end of the burner hole.

10. A method of inhibiting the build-up of glass about a burner hole in a high purity fused silica glass furnace as defined in claim 9 including the step of discharging inert gas in a columnar form about the generated flame.

11. A method of inhibiting the build-up of glass about a burner hole in a high purity fused silica glass furnace as defined in claim 9 including the steps of discharging inert gas from a plurality of outlet holes surrounding the burner and directing such gas toward the burner hole.

12. A method of inhibiting the build-up of glass about a burner hole in a high purity fused silica glass furnace as defined in claim 11 including the steps of flowing said inert gas along wall portions of said burner hole and impeding the combustion of the re-circulated furnace gases adjacent the exit end of said burner hole.

13. A method of inhibiting the build-up of glass about a burner hole in a high purity fused silica glass furnace as defined in claim 9 including the steps of directing said inert gas in such a manner so as to reduce the amount of interaction between the infiltrated air and the re-circulated furnace gases and thereby substantially reducing the amount of glass build-up about the burner hole.

14. A method of inhibiting the build-up of glass about a burner hole in a high purity fused silica glass furnace as defined in claim 9 including the steps of flowing said inert gas through said burner hole and out an exit end thereof, forming a curtain of the inert gas between the re-circulated furnace gases and the infiltrated air, separating the gases and air adjacent the exit end of the burner hole, and inhibiting the combustion of the furnace gases by the oxygen in the infiltrated air and thereby reducing the amount of glass build-up about the burner hole.

15. A furnace for producing silica glass with minimal build-up of glass about burner holes comprising, cavity means within a furnace structure for retaining a newly-formed glass boule and for retaining and circulating unburned furnace gases, at least one burner hole having sidewall portions, an inlet end, and an outlet end communicating with said cavity means, burner means positioned adjacent said inlet end of said at least one burner hole for providing a flame through said burner hole, means for permitting infiltrated air to enter said cavity means, and means for separating said circulating unburned furnace gases adjacent said outlet end of said burner hole from the infiltrated air so as to impede the combustion of said gases adjacent said burner hole outlet and thereby inhibit the deposit and build-up of glass thereabout.

16. A furnace for producing silica glass with minimal build-up of glass about burner holes as defined in claim 15 wherein said separating means includes a curtain of inert gas flowing between and in contact with both sidewalls of said burner hole and the flame generated by said burner means.

17. A furnace for producing silica glass with minimal build-up of glass about burner holes as defined in claim 15 wherein said separating means includes a tubular member surrounding said burner means, said tubular member having a plurality of outlet holes, said outlet holes being spaced about said burner means and positioned toward said at least one burner hole, and means for supplying an inert gas selected from argon and nitrogen to said tubular member for discharge from said outlet holes in the form of an inert gas curtain about the flame generated by said burner means.

18. A furnace for producing silica glass with minimal build-up of glass about burner holes as defined in claim 15 wherein said separating means also separates oxygen supplied by said burner means for combustion of the burner gas from the circulating unburned furnace gases so as to maintain the efficiency of the burner means.

* * * * *